United States Patent
Shukla

(10) Patent No.: US 10,993,164 B1
(45) Date of Patent: Apr. 27, 2021

(54) PATH SELECTION BETWEEN WIRELESS MESH NETWORK DEVICES

(71) Applicant: Amazon Technologies, Inc., Seattle, WA (US)

(72) Inventor: Ashish Kumar Shukla, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 152 days.

(21) Appl. No.: 16/131,810

(22) Filed: Sep. 14, 2018

(51) Int. Cl.
*H04W 40/02* (2009.01)
*H04W 28/04* (2009.01)
*H04W 88/04* (2009.01)
*H04W 84/18* (2009.01)

(52) U.S. Cl.
CPC ........... *H04W 40/02* (2013.01); *H04W 28/04* (2013.01); *H04W 84/18* (2013.01); *H04W 88/04* (2013.01)

(58) Field of Classification Search
CPC .................................................... H04W 40/02
See application file for complete search history.

(56) References Cited

U.S. PATENT DOCUMENTS

| 2016/0205609 A1* | 7/2016 | Sakoda | H04W 40/248 370/338 |
| 2016/0373997 A1* | 12/2016 | Petersen | H04W 72/0406 |
| 2017/0250898 A1* | 8/2017 | Sakoda | H04L 45/123 |

OTHER PUBLICATIONS

Local and Metropolitan Area Networks—Specific Requirements, IEEE Std 802.11-2012, pp. 1380-1410, copyright 2012 IEEE.

* cited by examiner

*Primary Examiner* — Chi H Pham
*Assistant Examiner* — Raul Rivas
(74) *Attorney, Agent, or Firm* — Lowenstein Sandler LLP

(57) ABSTRACT

Technologies for path selection in wireless mesh network of wireless network devices are described. One method includes receiving a first response from a second mesh network device and a second response wirelessly from the second mesh network device, the first response associated with a first request to establish a first wireless path with a third mesh network device and the second response associated with a second request to establish a second wireless path with a fourth mesh network device. The method determines that the first response and the second response include a same sequential number (SN) for the second mesh network device. The method forwards the first response to the third mesh network device and forwards the second response to the fourth mesh network device.

20 Claims, 10 Drawing Sheets

PATH SELECTION BETWEEN WIRELESS MESH NETWORK DEVICES

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

A wireless mesh network may support establishing point-to-point wireless links between the participating communication devices. A network device may utilize the wireless mesh network for accessing digital content stored on one or more digital content servers within or outside of the mesh network.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
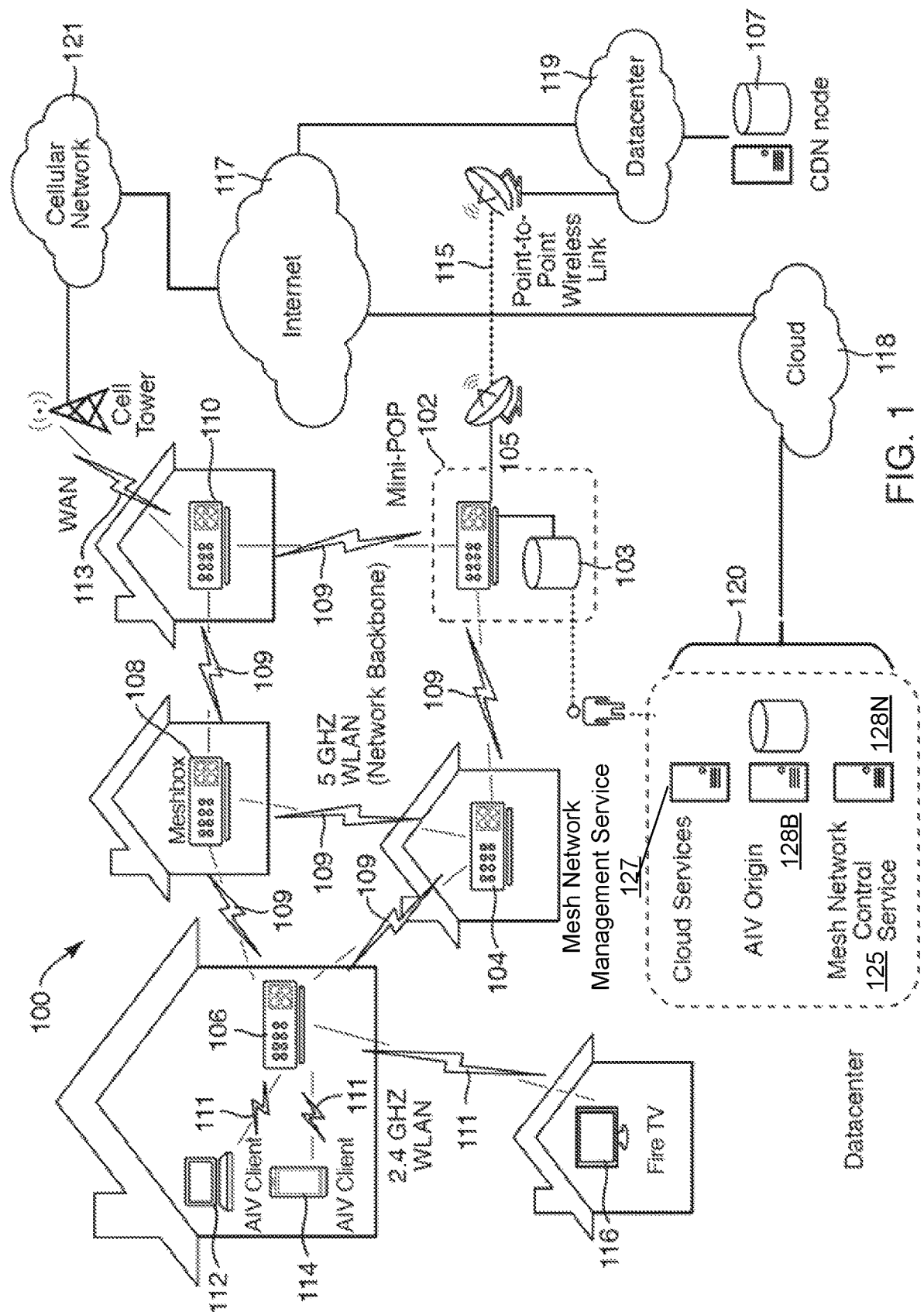
FIG. 1 is a network diagram of network hardware devices organized in a wireless mesh network (WMN) for content distribution to client devices in an environment of limited connectivity to broadband Internet infrastructure according to one embodiment.

Technologies for path selection in wireless mesh network of wireless network devices are described. Described herein is a wireless mesh network (WMN) containing multiple mesh network devices (also referred to herein as mesh STAs), organized in a mesh topology. A WMN is typically constrained by the amount of available storage, as well as network backhaul bandwidth (e.g., a connection to a larger content delivery network (CDN)). Mesh stations (mesh STAs) in a mesh network that operate according to the IEEE 802.11s standard rely on a default Hybrid Wireless Mesh Path (HWMP) selection protocol, which is based on ad-hoc on-demand distance vector (AODV) protocol to communicate with other stations in the mesh network. There are some problems in the existing path discovery protocol that make mesh operations suboptimal under certain conditions. For example, path discovery failures occur when multiple mesh stations attempt to establish paths to the same target mesh node (also referred to as destination mesh node) around same time. In particular, each mesh HWMP path selection element contains a HWMP sequential number (HWMP SN or just SN) that allows recipients to distinguish newer from stale information. An HWMP SN is specific to a mesh STA. The IEEE 802.11s standard allows a mesh STA to keep re-using sequential numbers (SN) to avoid frequent path changes. When the re-use SN feature is disabled in a mesh STA, there are lots of throughput variations causing undesired behavior. By enabling SN reuse in the mesh STA for a specified time interval, as recommended by the standard, the mesh STA can avoid frequent path changes and minimize throughput variations. However, when multiple nodes start path discoveries to a destination node at almost the same time, an intermediate mesh STA, which participates in path selection multiple path originators and the same path target, propagates a first path reply (PREP) to a first path originator, but drops any subsequent PREPs that have the same SN and the same or worse path selection metric as the first PREP based on forwarding information at the intermediate mesh STA. Thus, the other path originators fail to get their corresponding PREPs, failing the path discovery attempts. The other path originators then perform path discovery retries later on after a timeout to receive PREP. Future retries would fail as well depending on as long as a duration of the SN re-use is greater than a retry interval. Given path discovery timeouts and retries failures in this condition, the mesh STAs takes longer to establish connections. This may also impact transport protocols, like TCP, which enters to a congestion avoidance phase.

The embodiments described herein provide a solution to these problems caused when multiple originator mesh STAs attempt to establish wireless paths to the same designation mesh STA around the same time. One wireless mesh station includes a first, a second, and a third wireless local area network (WLAN) radios and a processor operatively coupled to each radio. The processor receives a first path request (PREQ) from a first originator mesh station (mesh STA) via the first WLAN radio and a second PREQ from a second originator mesh STA via the third WLAN radio within a specified time interval. The processor propagates the first PREQ and the second PREQ to a target mesh STA via the second WLAN radio. The processor receives a first path reply (PREP) from the target mesh STA via the second WLAN radio. The first PREP includes a first sequential number (SN) of the target mesh STA and a first path selection metric of a wireless path to the target mesh STA. The processor creates or updates and stores forwarding information to reach the target mesh STA with the first SN and the first path selection metric. The processor propagates the first PREP to the first originator mesh STA via the first WLAN radio. The first PREP includes the first SN and the first path selection metric. The processor receives a second PREP from the target mesh STA via the second WLAN radio. The second PREP includes the same first SN of the target mesh STA and a second path selection metric of the wireless path to the target mesh STA. Conventionally, mesh stations would drop the second and third PREPs with the same SN when the path selection metric is the same or worse than the first PREP. The embodiments described herein, however, propagate PREPs with the same SN when PREPs are received within the specified time period. For example, the processor propagates the second PREP to the second originator mesh STA via the third WLAN radio. The second PREP includes the first SN and a most current one of the first path selection metric and the second path selection metric.

The term propagate is used to describe how elements are not transmitted "as is" across the network but are processed and modified along the way. Many HWMP elements are intended to be processed and propagated across a mesh basis service set (MBSS) by mesh STAs. Each propagation is subject to certain rules or limitations. For example, certain parameters in the HWMP elements are updated during the propagation like the originator of an HWMP element sets the initial value of the Element TTL. The mesh STA that receives the HWMP element shall propagate it if the received value of Element TTL is greater than 1. Before propagating the HWMP element, the mesh STA decrements the Element TTL value.

With respect to HWMP sequence numbering, HWMP uses sequence numbers to prevent the creation of path loops and to distinguish stale and fresh path information. Each mesh STA keeps its own HWMP SN that it increments, uses in HWMP elements, and processes according to the HWMP rules. HWMP SNs for other mesh STAs are maintained in the forwarding information. An HWMP SN is included in the PREQ, PREP, and PERR elements, for example. The HWMP SN in the forwarding information is updated whenever a mesh STA receives new (i.e., not stale) information about the HWMP SN from a PREQ, PREP, or PERR that may be received relative to that originator mesh STA, target mesh STA, or destination mesh STA. HWMP depends on each mesh STA in the network to own and maintain its HWMP SN to guarantee the loop-freedom of all paths towards that mesh STA. A mesh STA increments its own HWMP SN in the following two circumstances: 1) If it is an originator mesh STA, it shall increment its own HWMP SN immediately before it starts a path discovery; and 2) If it is a target mesh STA, it shall update its own HWMP SN to maximum (current HWMP SN target HWMP SN in the PREQ)+1 immediately before it generates a PREP in response to a PREQ. Circumstance 1) may prevent conflicts with previously established reverse paths towards the originator mesh STA. However, it might be advantageous not to increment the HWMP SN too frequently. For circumstance 2), the target HWMP SN of the PREQ is relevant when a link was broken along the path and the stored sequence number was increased at an intermediate mesh STA. HWMP SNs are processed as follows: a) HWMP SNs are incremented monotonically as unsigned integers; b) comparing HWMP SNs is done using a circular modulo $2^{32}$ comparison.

In addition to the parameters contained in the basic forwarding information, the forwarding information to a destination defined by HWMP also contains at least the destination HWMP SN, the path metric, and the number of hops. Conventionally, PREQ elements and PREP elements create or update the forwarding information of the mesh STAs that process these elements as follows:

The mesh STA may create or update its forwarding information to the transmitter of the element if the path metric improves.

The mesh STA shall create or update its forwarding information to the originator mesh STA, if it received a PREQ, and one of the following conditions is met:
  The Originator HWMP SN >HWMP SN in the forwarding information for this originator mesh STA, or
  The Originator HWMP SN=HWMP SN in the forwarding information for this originator mesh STA AND the updated path metric is better than the path metric in the forwarding information.

The mesh STA shall create or update its forwarding information to the target mesh STA, if it received a PREP, and one of the following conditions is met:
  The Target HWMP SN >HWMP SN in the forwarding information for this target mesh STA, or
  The Target HWMP SN=HWMP SN in the forwarding information for this target mesh STA AND the updated path metric is better than the path metric in the forwarding information. It should be noted that the mesh STA drops PREP for other destined for other mesh STAs based on forwarding information having same SN with the same or worse metric.

In the embodiments describe herein, PREQ elements and PREP elements create or update the forwarding information of the mesh STAs that process these elements as follows:

The mesh STA may create or update its forwarding information to the transmitter of the element if the path metric improves.

The mesh STA shall create or update its forwarding information to the originator mesh STA, if it received a PREQ, and one of the following conditions is met:
  The Originator HWMP SN >HWMP SN in the forwarding information for this originator mesh STA, or
  The Originator HWMP SN=HWMP SN in the forwarding information for this originator mesh STA AND the updated path metric is better than the path metric in the forwarding information.

The mesh STA shall create or update its forwarding information to the target mesh STA, if it received a PREP, and one of the following conditions is met:
  The Target HWMP SN >HWMP SN in the forwarding information for this target mesh STA, or
  The Target HWMP SN=HWMP SN in the forwarding information for this target mesh STA AND the updated path metric is better than the path metric in the forwarding information.
  The Target HWMP SN=HWMP SN in the forwarding information for this target mesh STA AND the PREP is destined for another originator mesh STA.

It should be noted that the intermediate node (F) shall update the forwarding path to the destination node (D), if SN is higher or SN is same but metric is better (same as the existing 802.11s rules), however, in addition to this, the intermediate node (F) shall forward PREPs meant for different destinations if SNs of the PREPs are the same as the existing forwarding information SN (allow PREP forwarding for different S2 and S3). These PREPS can be considered forwarded PREPs. The metric in the forwarded PREP shall be based on F's current forwarding information metric. It should be noted that intermediate node (F) has the best path, based on metric, to D based on multiple received PREPs from destination node (D). This means that while sending PREP to different sources, the intermediate node (F) may update metric value based on its forwarding table information. The above changes ensure that the intermediate node (F) maintains a best path to destination node (D) at the same time it also forwards PREP for different path discovery originators as long as SN remains same irrespective of the path metric. With this change, all mesh originator nodes (labeled S1, S2, and S3 in FIG. 4) receives PREP and establishes path to the destination node (D) at the same time.

FIG. 1 is a network diagram of network hardware devices 102-110, organized in a wireless mesh network (WMN) 100, for content distribution to client consumption devices in an environment of limited connectivity to broadband Internet infrastructure according to one embodiment. The WMN 100 includes multiple network hardware devices 102-110 that connect together to transfer digital content through the WMN 100 to be delivered to one or more client consumption devices connected to the WMN 100. In the depicted embodiment, the WMN 100 includes a miniature point-of-presence (mini-POP) device 102 (also referred to as a mini-POP device), having a first wired connection to an attached storage device 103 and potentially at least one of a wired connection 105 or point-to-point wireless connection 115 to a content delivery network (CDN) device 107 (server of a CDN or a CDN node) of an Internet Service Provider (ISP), or both. The CDN device 107 may be a POP device, an edge server, a content server device, or another device of the CDN. The mini-POP device 102 may be similar to POP devices of a CDN in operation. However, the mini-POP device 102 is called a miniature to differentiate it from a POP device of a CDN given the nature of the mini-POP device 102 being a single ingress point to the WMN 100; whereas, the POP device of a CDN may be one of many in the CDN.

The point-to-point wireless connection 115 may be established over a point-to-point wireless link 115 between the mini-POP device 102 and the CDN device 107. Alternatively, the point-to-point wireless connection 115 may be established over a directional microwave link between the mini-POP device 102 and the CDN device 107. In other embodiments, the mini-POP device 102 is a single ingress node of the WMN 100 for the content files stored in the WMN 100. Thus, the mini-POP 102 may be the only node in the WMN 100 having access to the attached storage and/or a communication channel to retrieve content files stored outside of the WMN 100. In other embodiments, multiple mini-POP devices may be deployed in the WMN 100, but the number of mini-POP devices may be much smaller than a total number of network hardware devices in the WMN 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. The network hardware devices of the WMN 100 may not have direct access to the mini-POP device 102, but can use one or more intervening nodes to get content from the mini-POP device. The intervening nodes may also cache content that can be accessed by other nodes. The network hardware devices may also determine a shortest possible path between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless connection 115. The point-to-point wireless connection 115 can be considered a broadband connection for the WMN 100. In some cases, the mini-POP device 102 does not have an Internet connection via the point-to-point wireless connection 115 and the content is stored only in the attached storage device 103 for a self-contained WMN 100. In such cases, the content in the attached storage can be manually refreshed from time to time.

The WMN 100 also includes multiple mesh nodes 104, 106, 108, 110 (also referred to herein as meshbox nodes and network hardware devices). The mesh nodes 104, 106, 108, 110 may establish multiple P2P wireless connections 109 between mesh nodes 104, 106, 108, 110 to form a network backbone. It should be noted that only some of the possible P2P wireless connections 109 are shown between the mesh nodes 104, 106, 108, 110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection. The mesh nodes 104, 106, 108, 110 (and the mini-POP device 102) are MRMC mesh network devices. As described herein, the mesh nodes 104, 106, 108, 110 do not necessarily have reliable access to the CDN device 107. The mesh nodes 104, 106, 108, 110 (and the mini-POP device 102) wirelessly communicate with other nodes via the network backbone via a first set of WLAN channels reserved for inter-node communications. The mesh nodes 102-110 communicate data with one another via the first set of WLAN channels at a first frequency of approximately 5 GHz (e.g., 5 GHz band of the Wi-Fi® network technologies).

Each of the mesh nodes 104, 106, 108, 110 (and the mini-POP device 102) also includes multiple node-to-client consumption devices (N2C) wireless connections 111 to wirelessly communicate with one or more client consumption devices via a second set of WLAN channels reserved for serving content files to client consumption devices connected to the WMN 100. In particular, the second mesh node 106 is wirelessly coupled to a first client consumption device 112 via a first N2C wireless connection 111, a second client consumption device 114 via a second N2C wireless connection 111, and a third client consumption device 116 via a third N2C wireless connection 111. Client consumption devices can include TVs, mobile phones, streaming media players, PCs, Tablets, game consoles, and the like. The second node 106 wirelessly communicates with the client consumption devices via the second set of WLAN channels at a second frequency of approximately 2.4 GHz (e.g., 2.4 GHz band of the Wi-Fi® network technologies).

Each of the mesh nodes 104, 106, 108, 110 (and the mini-POP device 102) also includes a cellular connection 113 to wirelessly communicate control data between the respective node and a second device 118 hosting a mesh network control service described below. The cellular connection 113 may be a low bandwidth, high availability connection to the Internet 117 provided by a cellular network. The cellular connection 113 may have a lower bandwidth than the point-to-point wireless connection 115. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The second device 118 may be one of a collection of devices organized as a cloud computing system that that hosts one or more services 120. Although cellular connection 113 may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the WMN 100 remotely. Also, the cellular connection 113 may aid in the debugging and optimization of the WMN 100. In other embodiments, other low bandwidth services may also be offered through this link (e.g. email, shopping on Amazon.com, or the like).

The services 120 may include a mesh network control service 125 and a mesh network management service 127. The services 120 may also include cloud services to control setup of and manage the mesh nodes, as well as other cloud services. The mesh network control service 125 can be one or more cloud services. These cloud services can include a metric collector service, a health and status service, a link selection service, a channel selection service, a content request aggregation service, or the like. There may be APIs for each of these services.

Although only four mesh nodes 104, 106, 108, 110 are illustrated in FIG. 1, the WMN 100 can use many mesh nodes, wireless connected together in a mesh network, to move content through the WMN 100. The 5 GHz WLAN channels are reserved for inter-node communications (i.e., the network backbone). Theoretically, there is no limit to the number of links a given Meshbox node can have to its neighbor nodes. However, practical considerations, including memory, routing complexity, physical radio resources, and link bandwidth requirements, may place a limit on the number of links maintained to neighboring mesh nodes. Meshbox nodes may function as traditional access points (APs) for devices running client software (i.e., a media client). In one embodiment, the client software may be an application or other program designed to enable access to the CDN catalog and provide for playback video titles or other media items selected therefrom, in response to a request from a user. The 2.4 GHz WLAN channels are reserved for serving client consumption devices. The 2.4 GHz band may be chosen for serving media clients because there is a wider device adoption and support for this band. Additionally, the bandwidth requirements for serving client consumption devices will be lower than that of the network backbone. The number of media clients that each Meshbox node can support depends on a number of factors including memory, bandwidth requirements of the media client, incoming bandwidth that the Meshbox node can support, and the like. For example, the Meshbox nodes provide coverage to users who subscribe to the content delivery service and consume that service through the client consumption devices (e.g., a mobile phone, a set top box, a tablet, or the like). It should be noted that there is a 1-to-many relationship between Meshbox nodes and households (not just between nodes and media clients). This means the service can be provided without necessarily requiring a user to have a Meshbox node located in their house, as illustrated in FIG. 1. As illustrated, the second mesh node 106 services two client consumption devices 112, 114 located in a first house, as well as a third client consumption device 116 (e.g., a TV client) located in a second house. The Meshbox nodes can be located in various structures, and there can be multiple Meshbox nodes in a single structure.

The WMN 100 may be used to address two main challenges: moving high bandwidth content to users and storing that content in the limited available storage of the WMN itself. The first challenge may be addressed in hardware through the radio links between mesh nodes and the radio links between mesh nodes and client consumption devices, and in software by the routing protocols used to decide where to push traffic and link and channel management used to configure the WMN 100. The second challenge may be addressed by borrowing from the existing content distribution strategy employed by the content delivery services using caches of content close to the user. The architecture to support content caching is known as a CDN. An example CDN implementation is the AWS CloudFront service. The AWS CloudFront service may include several point-of-presence (POP) racks that are co-located in datacenters that see a lot of user traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the WMN 100 includes the mini-POP device 102 that is designed to handle smaller amounts of traffic than a typical POP rack. Architecturally, the mini-POP device 102 may be designed as a Meshbox node with storage attached (e.g. external hard disk). The mini-POP device 102 may function identically to a POP device with the exception of how cache misses are handled. Because of the lack of broadband Internet infrastructure, the mini-POP device 102 may not have a wired or wireless network connection to the next level of cache (i.e., in CDN node 107). In another embodiment, the mini-POP device 102 may have a network connection (e.g., via the Internet) to the next level of cache, but this connection may not be a high-speed backhaul such as that used in a traditional data center. The following describes two different solutions for providing access to the next level of cache to the mini-POP device 102.

In one embodiment, the mini-POP device 102 is coupled to an existing CDN device 107 via a directional microwave link or other point-to-point wireless link 115. A directional microwave link is a fairly easy way to get a relatively high bandwidth connection between two points. However, line of sight is required which might not be possible with terrain or building constraints. In another embodiment, the mini-POP device 102 can operate with a human in the loop (HITL) to update the cache contents. HITL implies that a person will be tasked with manually swapping out the hard drives with a hard drives with the updated content or adding the content to the hard drive. This solution may be a relatively high bandwidth but extremely high latency solution and may only be suitable if the use cases allow longer times (e.g., hours) to service a cache miss. It should be noted that the mini-POP has a network connection that need not be an Internet connection to handle cache misses. These requests are forwarded to the CDNs. Alternatively, some mini-POP devices may not have network connections and do not handle cache misses as described herein.

The WMN 100 may be considered a multi-radio multi-channel (MRMC) mesh network. MRMC mesh networks are an evolution of traditional single radio WMNs and a leading contender for combatting the radio resource contention that has plagued single radio WMNs and prevents them from scaling to any significant size. The WMN 100 has multiple devices, each with multi-radio multi-channel (MRMC) radios. The multiple radios for P2P connections of the mesh network devices allow the WMN 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. The paths to fetch content files may not be a linear path within the mesh network.

The WMN 100 can provide adequate bandwidth, especially node-to-node bandwidth. For video, content delivery services recommend a minimum of 900 Kbps for standard definition content and 3.5 Mbps for high definition content. It should be noted that the minimum requirement for 720 HD is 1.9 Mbps and a maximum is 3.5 Mbps. For some services to provide HD content, the 3.5 Mbps can be considered the minimum requirement. The WMN 100 can provide higher bandwidths than those recommended for standard definition and high definition content. Prior solutions found that for a 10,000-node mesh network covering one square kilometer, the upper bound on inter-node traffic is 221 kbps. The following can impact bandwidth: forwarding traffic, wireless contention (MAC/PHY), and routing protocols.

In some embodiments, the WMN 100 can be self-contained as described herein. The WMN 100 may be self-contained in the sense that content resides in, travels through, and is consumed by nodes in the mesh network without requiring the content to be fetched outside of the WMN 100. In other embodiments, the WMN 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the WMN 100 via the point-to-point wireless connection 115 or the HITL process at the mini-POP device 102. Availability and impact on cost in terms of storage may be relevant factors in determining which content is to be injected into the WMN 100 and which content is to remain in the WMN 100. A challenge for traditional mesh network architectures is that this content is high bandwidth (in the case of video) and so the gateway nodes that connect the mesh to the larger Internet must be also be high bandwidth. However, taking a closer look at the use case reveals that this content, although high bandwidth, does not need to be low latency. The embodiments of the WMN 100 described herein can provide distribution of content that is high bandwidth, but in a manner that does not need low latency. Thus, popular content can reside closer to the client consumption devices of the WMN 100 and reduce the latency normally associated with retrieving that content from the CDN.

In some embodiments, prior to consumption by a node having a media client itself or being wirelessly connected to a media client executing on a client consumption device, the content may be pulled close to that node. This may involve either predicting when content will be consumed to proactively move it closer (referred to as caching) or always having it close (referred to as replication). Content replication is conceptually straightforward, but may impact storage requirements and requires apriori knowledge on the popularity of given titles.

Another consideration is where and how to store content in the WMN 100. The WMN 100 can provide some fault tolerance so that a single mesh node becoming unavailable for failure or reboot has minimal impact on availability of content to other users. This means that a single mesh node is not the sole provider of a piece of content. The WMN 100 can use reliability and availability mechanisms and techniques to determine where and how to store content in the WMN 100.

The WMN 100 can be deployed in an unpredictable environment. Radio conditions may not be constant and sudden losses of power may occur. The WMN 100 is designed to be robust to temporary failures of individual nodes. The WMN 100 can be designed to identify those failures and adapt to these failures once identified. Additionally, the WMN 100 can include mechanisms to provide secure storage of the content that resides within the WMN 100 and prevent unauthorized access to that content.

The cloud services 120 of the WMN 100 can include mechanisms to deal with mesh nodes that become unavailable, adding, removing, or modifying existing mesh nodes in the WMN 100. The cloud services 120 may also include mechanisms for remote health and management. For example, there may be a remote health interface, a management interface, or both to access the mesh nodes for this purpose. The cloud services 120 can also include mechanisms for securing the WMN 100 and the content that resides in the WMN 100. For example, the cloud services 120 can control device access, DRM, and node authentication.

Figure 2:
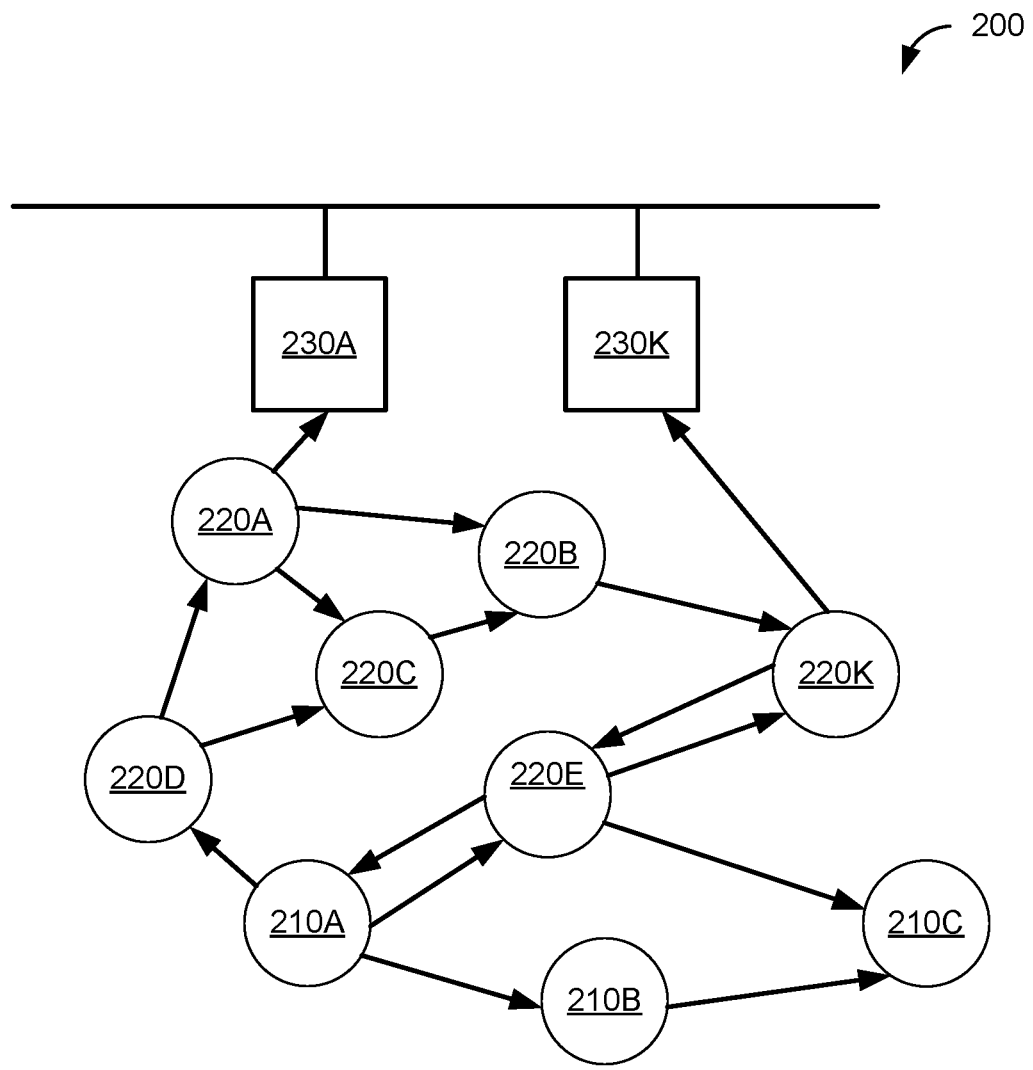
FIG. 2 is a functional network diagram of an illustrative example of a wireless mesh network operating in accordance with embodiments of the present disclosure.

FIG. 2 is a functional network diagram of an illustrative example of a wireless mesh network operating in accordance with embodiments of the present disclosure. In one embodiment, each of the network devices of wireless mesh network 100 of FIG. 1 may implement functions of one or more functional components of FIG. 2. In other embodiments, various other wireless mesh networks may include hardware and/or software components which may implement functions of one or more functional components of FIG. 2.

As schematically illustrated by FIG. 2, an example wireless mesh network 200 may include multiple mesh network nodes including communication devices that implement the functions of wireless mesh point stations (MP STA) 210A-210C, mesh access points (MAP) 220A-220F, and mesh portals (MPP) 230A-230K. In one embodiment, the wireless mesh network 200 may be compliant with IEEE802.11s protocol, which supports broadcast/multicast and unicast delivery using radio-aware path selection metrics over self-configuring multi-hop topologies.

A wireless mesh point station may be provided by a communication device that includes hardware and/or software for implementing Medium Access Control (MAC) and physical layer (PHY) interface to the wireless medium. A wireless access point may be provided by a wireless mesh point station that provides distribution services (i.e., forwarding MAC service data units (MSDUs) including data and network management frames to a wireless destination) via the wireless medium for associated wireless mesh point stations. A mesh portal, also referred to as a network ingress device, is a wireless access point that provides distribution and integration services (i.e., MSDU translation to another network format and MSDU forwarding to a wireless or wired destination), e.g., by one or more wireline or wireless connections to a backbone network.

As noted herein above, network devices may establish peer-to-peer wireless links and transmit messages to each other. In particular, messages may be transferred, through other nodes, between two nodes that are not in direct communication with each other. Thus, a network device may be a source, a destination, or an intermediate node on a mesh path (also referred to herein as a network path).

Upon booting up, a network device may discover and join a wireless mesh network operating in accordance the embodiments of the present disclosure (e.g., wireless mesh network 100 of FIG. 1). Discovering available wireless mesh networks may be performed by passive or active scanning. In the passive scanning mode, the network device records the information from any beacon frames that have been received on one or more radio channels. Beacon frames are periodically transmitted by wireless access points in order to allow network devices to detect and identify the wireless mesh network, as well as match communication parameters for determining whether to join the wireless mesh network. In the active scanning mode, the network device may transmit, on each of one or more radio channels supported by the network device, probe request frames in order to solicit responses from available networks. An access point receiving a probe request may generate a probe response advertising the network parameters.

Figure 3:
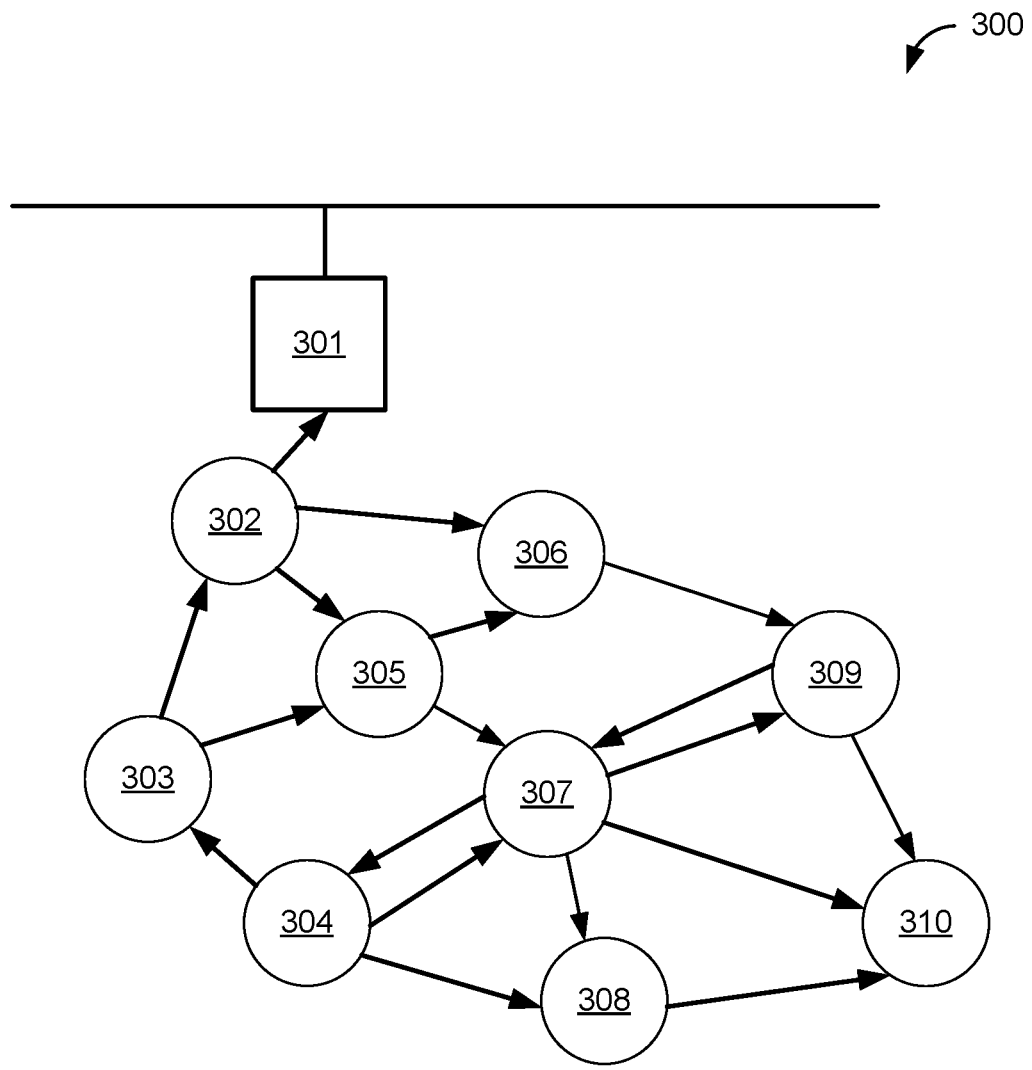
FIG. 3 schematically illustrates one embodiment of a path selection method implemented by a wireless mesh network operating in accordance with embodiments of the present disclosure.

FIG. 3 schematically illustrates one embodiment of a path selection method implemented by a wireless mesh network operating in accordance with embodiments of the present disclosure. As shown in FIG. 3, the wireless mesh network 300 may include nodes 301-310. The source node 304 may employ the dynamic path selection mode to find a path to the destination node 310. In an illustrative example, the source node may broadcast a network management frame including a path request (PREQ) information element specifying the destination node (e.g., using the MAC address of the destination node 310) and initializing the metric field to zero. Responsive to receiving a PREQ, an intermediate node (e.g., a node 307, 308, or 309) may increment the metric field of the PREQ to reflect the airtime of the last hop leading to this node. The intermediate node may then create a path to the source node 304 or update an existing path to the source node, and re-broadcast the PREQ by forwarding it to its neighboring nodes. Thus, whenever an intermediate node forwards a PREQ, the metric field in the PREQ will be updated to reflect the cumulative metric of the path to the source of the PREQ.

Responsive to receiving a PREQ, the destination node 310 may increment the metric field of the PREQ to reflect the airtime of the last hop leading to the destination node. The destination node may then select, among a plurality of candidate network paths between the source node 304 and the destination node 310, the network path having a minimal value of the network path selection metric.

Responsive to receiving a network management frame including the PREQ information element specifying the destination, an intermediate node (e.g., a node 307, 308, or 309) may create or update a path to the destination node 310 and forward the PREQ towards the source node 304. Upon receiving the PREQ, the source node 304 may create a path to the destination node 310. Upon receiving further PREQs specifying the same source node with a metric value better than the existing path, the destination node may update its path to the source node and send a new PREQ to the source node along the updated path. Participating network nodes may store the created and/or updated paths in their respective routing tables.

As noted herein above, mesh network devices, also referred to herein as "network nodes," may establish peer-to-peer wireless links and transmit messages to each other. In particular, messages may be transferred, through other nodes, between two nodes that are not in direct communication with each other. In an illustrative example, a wireless mesh network may be employed for digital content distribution to client network devices in an environment of limited connectivity to broadband Internet infrastructure.

In the 802.11s standard, mesh path selection of multi-hop paths between mesh STAs at the link layer creates forwarding information that is uutilized for MSDU/MMPDU forwarding. The standard allows for alternative and flexible implementations of path selection protocols and metrics. In some embodiments, the mesh STA can modify the default HWMP to address the problems set forth above when multiple originators establish paths to the same destination mesh node about the same time, as illustrated in more detail in FIG. 4. The HWMP is a mesh path selection protocol that combines the flexibility of on-demand path selection with proactive topology tree extensions. The combination of reactive and proactive elements of HWMP enables efficient path selection in a wide variety of mesh networks (with or without access to the infrastructure). HWMP uses a common set of protocol elements, generation and processing rules inspired by Ad Hoc On-Demand Distance Vector (AODV) protocol (IETF RFC 3561 [B34]) adapted for MAC address-based path selection and link metric awareness.

Figure 4:
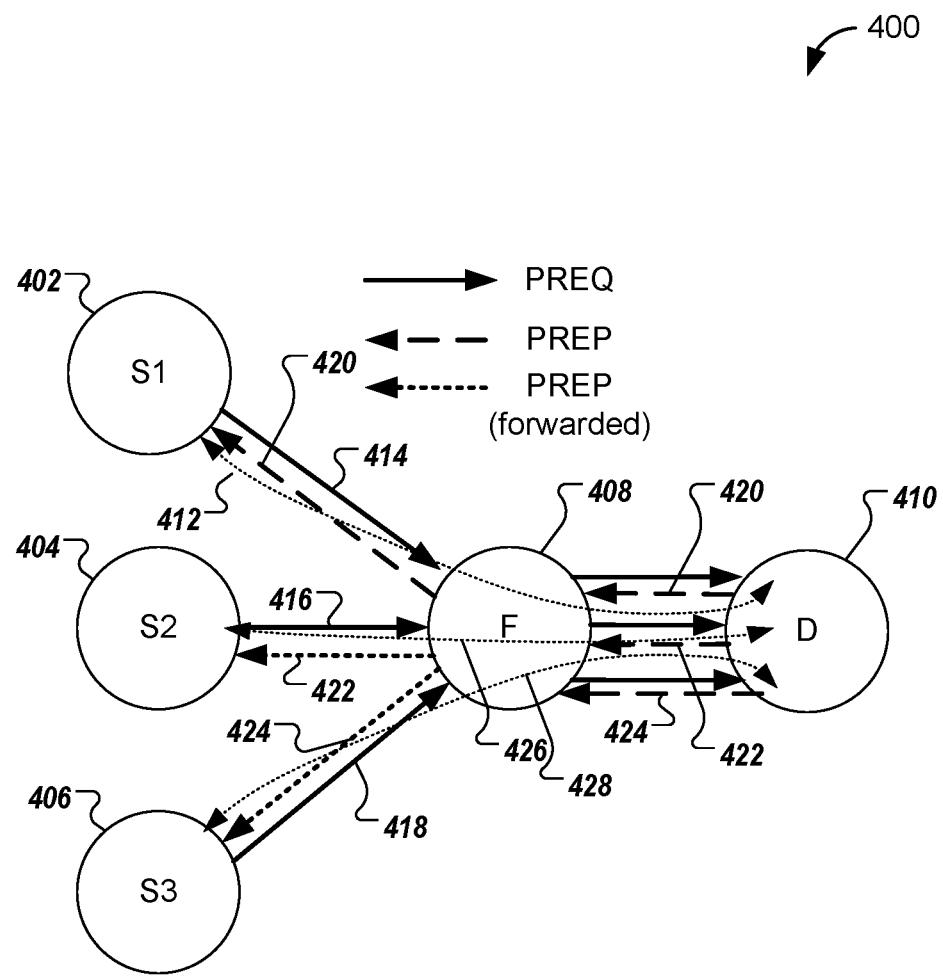
FIG. 4 schematically illustrates one embodiment of a path selection method implemented by a wireless mesh network operating in accordance with embodiments of the present disclosure.

FIG. 4 schematically illustrates one embodiment of a path selection method implemented by a wireless mesh network operating in accordance with embodiments of the present disclosure. In one embodiment, each of the network devices of wireless mesh network 400 of FIG. 4 may implement functions of one or more functional components of FIGS. 1-2. In other embodiments, various other wireless mesh networks may include hardware and/or software components which may implement functions of one or more functional components of FIGS. 1-2.

As schematically illustrated by FIG. 4, an example wireless mesh network 400 may include multiple path originator nodes, including mesh STA 402 (S1), mesh STA 404 (S2), mesh STA 406 (S3), an intermediate node 408 (F), and a destination mesh STA 410 (D). In one embodiment, the wireless mesh network 400 may be compliant with IEEE802.11s protocol, which supports broadcast/multicast and unicast delivery using radio-aware path selection metrics over self-configuring multi-hop topologies. The wireless mesh network 400 may use the HWMP for path selection and SN re-use may be enabled in each of the mesh STAs. For path discovery, path originator or path target designate very specific entities within the path discovery process. Both the path target and path originator are a path destination for a forward path and a reverse path respectively. Within the context of a single path request (PREQ) and a path reply (PREP) pair to establish a wireless path 412, a path originator is the mesh STA that triggers the path discovery.

For example, the mesh STA 402 (S1) sends a first PREQ 414 to an intermediate mesh STA 408 (labeled F for forwarding node). The intermediate mesh STA 408 is a mesh STA that participates in path selection and is neither path originator nor path target. Path target is the entity to which the path originator attempts to establish a path. In the depicted embodiment, the path originator, mesh STA 402 attempts to establish the wireless path 412 with a destination mesh STA 410 (labeled D for destination node). Each of the mesh STAs can have a MAC address. The wireless path 412 can have a forward path and a reverse path. The forward path is the mesh path to the path target, setup at the path originator and intermediate STAs and the reverse path is the mesh path to the path originator, setup at the path target and intermediate mesh STAs. As described herein each mesh HWMP path selection element contains HWMP SN that allows recipients of the element to distinguish newer from stale information. The HWMP SN is specific to a mesh STA. Forwarding information can be maintained by an originator mesh STA, an intermediate mesh STA, or a target mesh STA that allows the mesh STA to perform its path selection and forwarding functions. The terminology used when discussing forwarding information is relative to the mesh STA (reference mesh STA, given mesh STA or local mesh STA) and a particular mesh destination of the path. The following terms are specific to a given instance of the forwarding information: destination mesh STA—the end station (mesh STA) of a (forward or reverse) path; destination mesh STA address—the MAC address of the destination mesh STA; destination HWMP SN—the HWMP SN of the destination mesh STA; next-hop mesh STA—the next-hop mesh STA is the next peer mesh STA on the mesh path to the destination mesh STA; next-hop mesh STA address—the MAC address of the next-hop mesh STA; precursor mesh STA—a precursor mesh STA is a neighbor peer mesh STA on the mesh path that identifies a given mesh STA as the next-hop mesh STA to the destination mesh STA; precursor mesh STA address—the MAC address of the precursor mesh STA; lifetime—the time during which forwarding information remains active; unreachable destination—a destination mesh STA is considered unreachable by a source mesh STA or an intermediate mesh STA if the link to the next hop of the mesh path to this destination mesh STA, as derived from its forwarding information, is no longer usable; element time to live (Element TTL)—an integer number that is used to limit the number of hops an HWMP element may be processed and propagated; and root mesh STA—a root mesh STA is configured to originate pro-active PREQs or RANNs. It is the root of a path selection tree.

In general, as described above, the intermediate node (F) updates the forwarding path to the destination node (D), if SN is higher or SN is same but metric is better (same as the existing 802.11s rules), however, in addition to this, the intermediate node (F) forwards PREPs meant for different destinations if SNs of the PREPs are the same as the existing forwarding information SN (allow PREP forwarding for different S2 and S3). These PREPS can be considered forwarded PREPs. The metric in the forwarded PREP shall be based on F's current forwarding information metric. It should be noted that intermediate node (F) has the best path, based on metric, to D based on multiple received PREPs from destination node (D). This means that while sending PREP to different sources, the intermediate node (F) may update metric value based on its forwarding table information. The above changes ensure that the intermediate node (F) maintains a best path to destination node (D) at the same time it also forwards PREP for different path discovery originators as long as SN remains same irrespective of the path metric. With this change, all mesh originator nodes (S1, S2, and S3) receives PREP and establishes path to the destination node (D) at the same time.

As illustrated in FIG. 4, the mesh STA 402 (S1) sends a first PREQ 414 to an intermediate mesh STA 408. The mesh STA 404 (S2) and mesh STA 406 (S3) also send second PREQ 416 and third PREQ 418, respectively. A processor of the intermediate mesh STA 408 receives the first PREQ via a radio (e.g., a first 5 GHz WLAN radio), the second PREQ 416 via a radio (e.g., the same first 5 GHz WLAN radio or a second 5 GHz WLAN radio), the third PREQ 418 via a radio (e.g., the same first 5 GHz WLAN radio or a third 5 GHz WLAN radio). The first PREQ 414, second PREQ 416, and the third PREQ 418 can be received within a specified time interval. The specified time interval may be or correspond to the dot11MeshHWMPnetDiameterTraversalTime which defines when the HWMP SN is incremented since the previous increment. This mechanisms prevents mesh STAs from changing the path frequently, improving path stability and further reduce overhead. A mesh STA may use the same originator HWMP SN for a certain time interval and a destination mesh STA may use the same destination HWMP SN for a certain time interval.

Referring back to FIG. 4, the processor of the intermediate mesh STA 408, upon receiving the first PREQ 414 from the mesh STA 401, the second PREQ 416 from the mesh STA 404 (S2), and the third PREQ 418, respectively, the processor propagates the first PREQ 414, the second PREQ 416, and the third PREQ 418 to the destination mesh STA 410 (also referred to as a target mesh STA) via a radio (e.g., a second 5 GHz. WLAN radio), respectively. The destination mesh STA 410 can receive the PREQs within a certain time interval. As such, the SN in the corresponding PREPs for the destination mesh STA 410 will be the same. In particular, the intermediate mesh STA 408 receives a first PREP 420 from the destination mesh STA 410 via the second WLAN radio. The first PREP 420 includes a first SN and a first path selection metric of a wireless path to the destination mesh STA 410. The first path selection metric may be a first value that identifies a quality of the wireless path, such as a first airtime value. The intermediate mesh STA 408 creates or updates and stores forwarding information to reach the destination mesh STA 410 with the first SN and the first path selection metric. The intermediate mesh STA 408 propagates the first PREP 420 to the first originator mesh STA 402 via the first WLAN radio. The first PREP 420, propagated to the first originator mesh STA 402, includes the first SN and the first path selection metric. The intermediate mesh STA 408 receives a second PREP 422 from the destination mesh STA 410 via the second WLAN radio. The second PREP 422 includes the same first SN of the target mesh STA and a second path selection metric of the wireless path to the destination mesh STA 410. Instead of dropping the second PREP 422 as having the same SN, the intermediate mesh STA 408 propagates the second PREP 422 to the second originator mesh STA via the third WLAN radio to establish a second wireless path 426. The second PREP 422, propagated to the second originator mesh STA 404, includes the first SN and a most current one of the first path selection metric and the second path selection metric. The intermediate mesh STA 408 receives a third PREP 424 from the destination mesh STA 410 via the second WLAN radio. The third PREP 424 includes the same first SN of the target mesh STA and a third path selection metric of the wireless path to the destination mesh STA 410. Instead of dropping the third PREP 424 as having the same SN, the intermediate mesh STA 408 propagates the third PREP 424 to the second originator mesh STA via the third WLAN radio to establish a third wireless path 428. The third PREP 424, propagated to the third originator mesh STA 406, includes the first SN and a most current one of the first path selection metric and the third path selection metric.

In a further embodiment, the processor operates according to the HWMP selection protocol to communicate with other mesh STAs. Using HWMP selection protocol, the PREPs can be received as elements in HWMP Mesh Path Selection frames. The HWMP Mesh Path selection frames can be formatted according to the HWMP Selection protocol, which is based on the ad-hoc on-demand distance vector (AODV) protocol.

In a further embodiment, the third PREP 424 from the destination mesh STA 410 has a second SN that is higher than the first SN in the first PREP 420 and a third path metric selection metric that is higher than the first path selection metric. That is the second SN is higher than what is already stored in the forwarding information. The processor updates the forwarding information with the second SN and the third path selection metric and propagates the third PREP 424 with the second SN and the third path selection metric to the third mesh STA 406. In another embodiment, the third PREP 424 has the same SN but a third path metric selection metric that is higher than the first path selection metric. The processor can update the forwarding information with the third path selection metric and propagate the third PREP 424 with the third path selection metric to the third mesh STA 406. In another embodiment, the third PREP 424 has the same SN but the third path selection metric is the same as or lower than the first path selection metric. The processor can propagate the third PREP 424 with the same first SN and a most current one of the first path selection metric and the third path selection metric.

Figure 5:
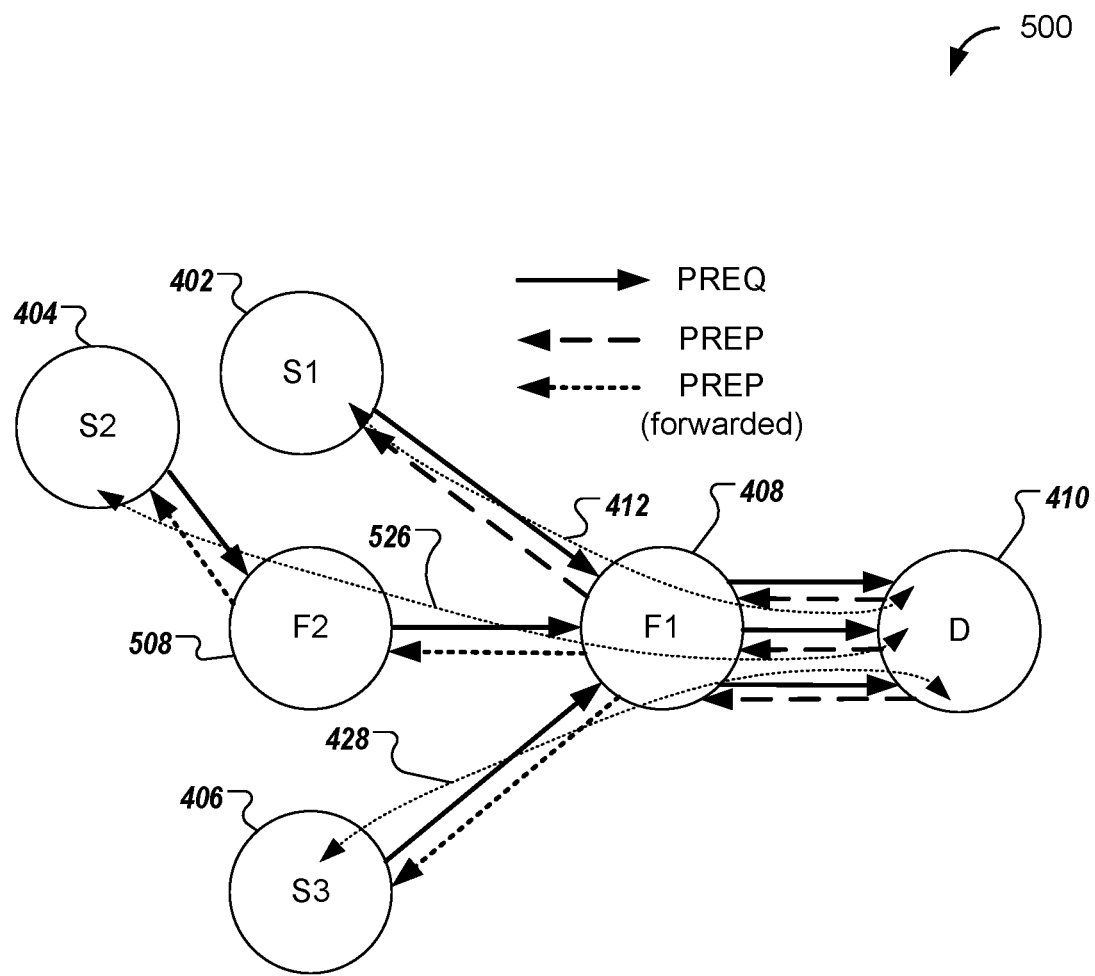
FIG. 5 schematically illustrates one embodiment of a path selection method implemented by a wireless mesh network operating in accordance with embodiments of the present disclosure.

FIG. 5 schematically illustrates one embodiment of a path selection method implemented by a wireless mesh network operating in accordance with embodiments of the present disclosure. As schematically illustrated by FIG. 5, an example wireless mesh network 500 may include multiple path originator nodes, including the same mesh STAs of the wireless mesh network 400 of FIG. 4, as noted by similar reference numbers, as well as another intermediate node mesh STA 508 (F2). The wireless path 412 and wireless path 428 can be established as described above. A wireless path 526 can be established in a similar manner to wireless path 426 in FIG. 4, except the PREQs and PREPs sent between the second mesh STA 404 and the intermediate mesh STA 408 go through the second intermediate mesh STA 508. FIG. 5 illustrates that the wireless paths can be established in different ways between the originator mesh STAs 402, 404, 406, and the same destination mesh STA 410 through any number of intermediate mesh STAs.

Figure 6:
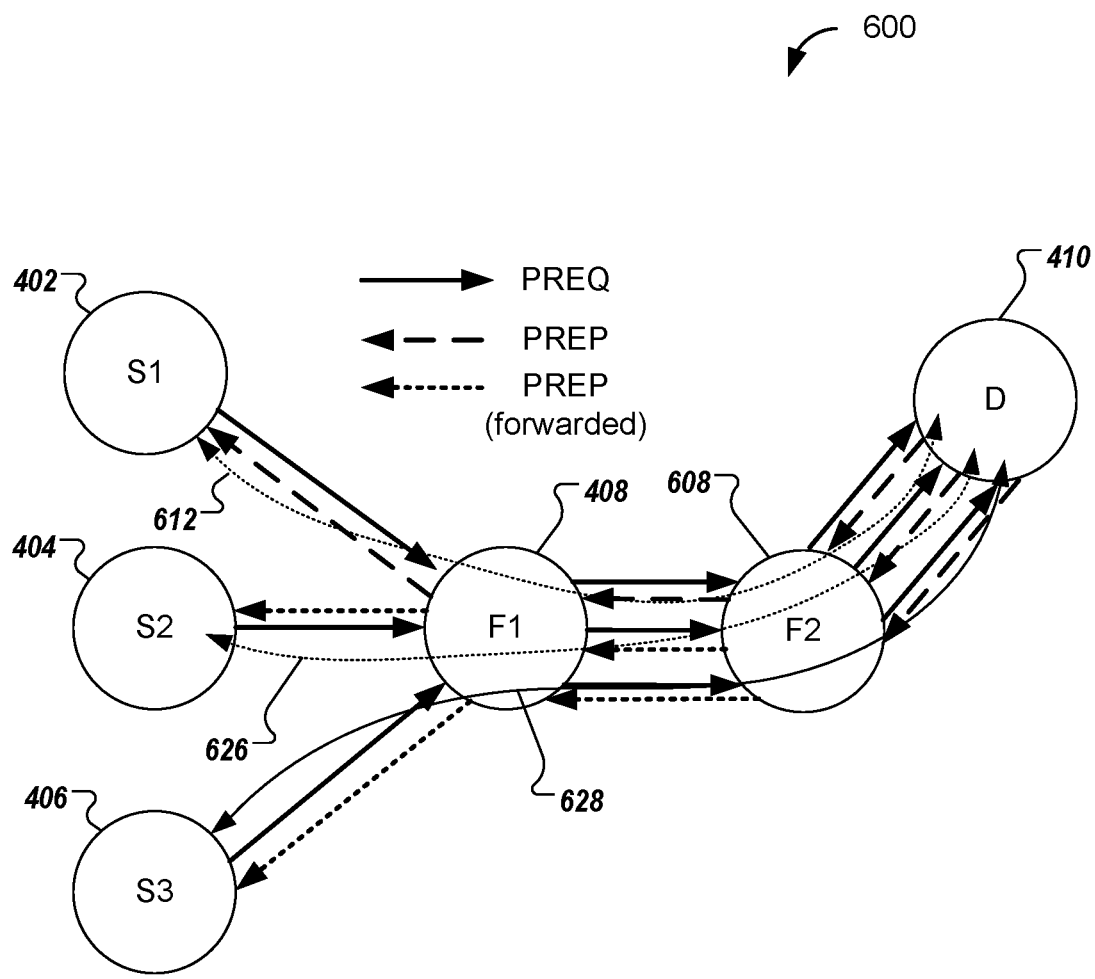
FIG. 6 schematically illustrates one embodiment of a path selection method implemented by a wireless mesh network operating in accordance with embodiments of the present disclosure.

FIG. 6 schematically illustrates one embodiment of a path selection method implemented by a wireless mesh network operating in accordance with embodiments of the present disclosure. As schematically illustrated by FIG. 6, an example wireless mesh network 600 may include multiple path originator nodes, including the same mesh STAs of the wireless mesh network 400 of FIG. 4, as noted by similar reference numbers, as well as another intermediate node mesh STA 608 (F2). In this embodiment, a wireless path 612 can be established between the first mesh STA 402 and the destination mesh STA 410 in a similar manner to wireless path 412 in FIG. 4, except the PREQs and PREPs sent between the intermediate mesh STA 408 and the destination mesh STA 410 go through the second intermediate mesh STA 608. A wireless path 626 can be established between the second mesh STA 404 and the destination mesh STA 410 in a similar manner to wireless path 426 in FIG. 4, except the PREQs and PREPs sent between the intermediate mesh STA 408 and the destination mesh STA 410 go through the second intermediate mesh STA 608. A wireless path 628 can be established between the third mesh STA 406 and the destination mesh STA 410 in a similar manner to wireless path 428 in FIG. 4, except the PREQs and PREPs sent between the intermediate mesh STA 408 and the destination mesh STA 410 go through the second intermediate mesh STA 608. FIG. 6 illustrates that the wireless paths can be established in different ways between the originator mesh STAs 402, 404, 406, and the same destination mesh STA 410 through any number of intermediate mesh STAs. The intermediate mesh STA 608 (F1) operates similar to the intermediate mesh STA 408 (F1) as described above with respect to FIG. 4 to handle PREQs and PREPs according to the embodiments described herein.

Figure 7:
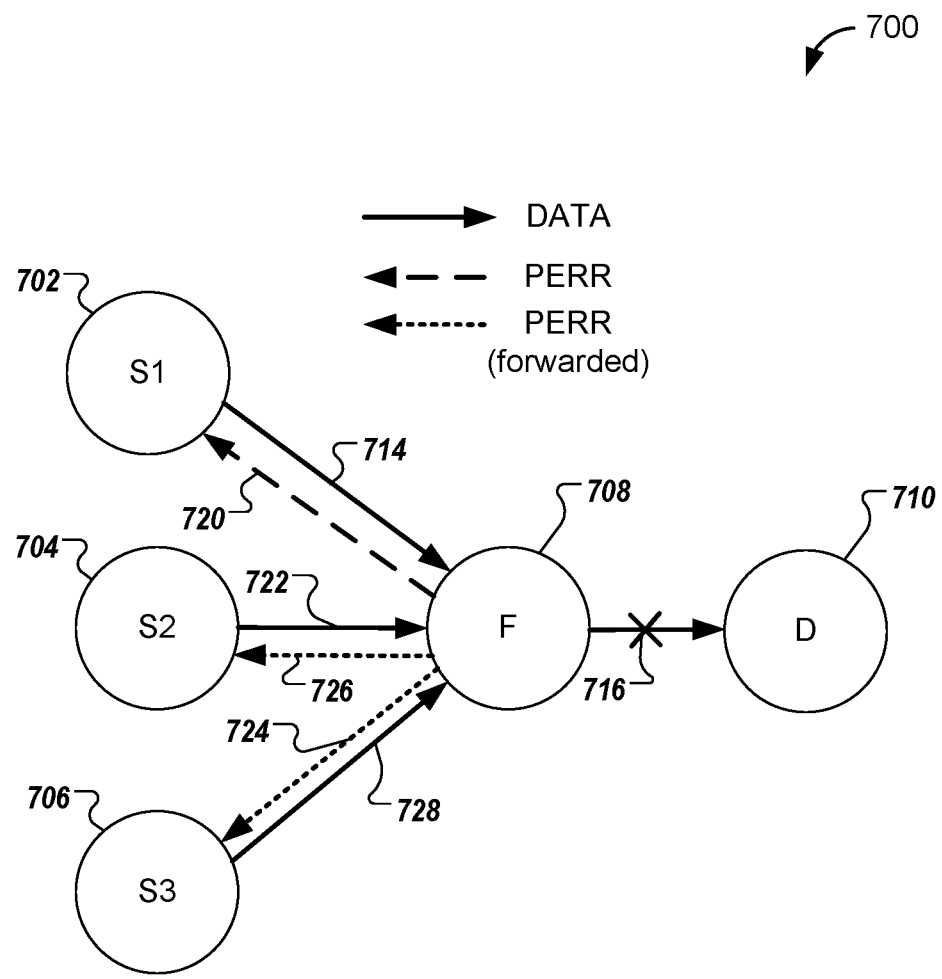
FIG. 7 schematically illustrates one embodiment of a path error detection method implemented by a wireless mesh network operating in accordance with embodiments of the present disclosure.

FIG. 7 schematically illustrates one embodiment of a path error detection method implemented by a wireless mesh network operating in accordance with embodiments of the present disclosure. In one embodiment, each of the network devices of wireless mesh network 700 of FIG. 7 may implement functions of one or more functional components of FIGS. 1-6. In other embodiments, various other wireless mesh networks may include hardware and/or software components which may implement functions of one or more functional components of FIGS. 1-6.

As schematically illustrated by FIG. 7, an example wireless mesh network 700 may include multiple path originator nodes, including mesh STA 702 (S1), mesh STA 704 (S2), mesh STA 706 (S3), an intermediate node 708 (F), and a destination mesh STA 710 (D). In one embodiment, the wireless mesh network 700 may be compliant with IEEE802.11s protocol, which supports broadcast/multicast and unicast delivery using radio-aware path selection metrics over self-configuring multi-hop topologies. The wireless mesh network 700 may use the HWMP for path selection and SN re-use may be enabled in each of the mesh STAs. Path Discovery messages are transmitted in a rate limited fashion, to avoid network congestion. The Path Error messages, which are used to notify source of active route detect broken path, are rate limited in somewhat incorrect way as described below.

For example, as illustrated in FIG. 7, mesh STAs 702 (S1), 704 (S2), and 706 (S3) are communicated with destination mesh STA 710 (D) through intermediate mesh STA 708. A link 716 between the intermediate mesh STA 708 (F) and the destination mesh STA 710 (D) fails. The intermediate mesh STA 708 (F) can detect the link failure. For example, the intermediate mesh STA 708 (F) finds no forwarding information to destination mesh STA 710 (D). The intermediate mesh STA 708 can detect the link failure when it receives data from any one of the originator mesh STAs. For example, the mesh STA 702 (S1) sends first data 714 to the intermediate mesh STA 708, the first data 714 destined to the destination mesh STA 710. The intermediate mesh STA 708 finds no forwarding information to the destination mesh STA 710 because of the link failure of link 716. As a result, the intermediate mesh STA 708 sends back a first path error message 720, such as a PERR element in a HWMP Mesh Path Selection frame, to the first mesh STA 702. Per the IEEE 802.11s protocol, the HWMP mesh path selection frame with the PERR element can only be sent after a specified time interval, referred to as dot11MeshHWMPperrMinInterval (e.g., default 100 ms interval). This is referred to as PERR throttling. Conventionally, since the intermediate mesh STA 708 already sent the first path error message 720 to the first mesh STA 702, the intermediate mesh STA 708 cannot send the PERR element to the second mesh STA 704 or third mesh STA 706 until after the specified time interval. So, when the second mesh STA 704 sends second data 722 (destined to the destination mesh STA 710), the intermediate mesh STA 708 does not send the PERR element, identifying the link failure, back to the second mesh STA 704 if the second data 722 is sent within the specified time interval. Similarly, when the third mesh STA 706 sends third data 724 (destined to the destination mesh STA 710), the intermediate mesh STA 708 does not send the PERR element, identifying the link failure, back to the third mesh STA 706 if the third data 724 is sent within the specified time interval. Since the second mesh STA 704 and the third mesh STA 706 fail to discover the failure of link 716, the second mesh STA 704 and the third mesh STA 706 continue to loose data frames to send the second data 722 and third data 724 until after the specified time interval.

In one embodiment, instead of PERR throttling based on a global interval, dot11MeshHWMPperrMinInterval, the PERR throttling is based on a per source-destination pair basis. That is a first specified time interval can be defined for a first pair ($1^{st}$-dot11MeshHWMPperrMinInterval), including the first mesh STA 702 and the destination mesh STA 710, while a second specified time interval can be defined for a second pair, including the second mesh STA 704 and the destination mesh STA 710, and a third specified time interval can be defined for a third pair, including the third mesh STA 706 and the destination mesh STA 710. Thus, upon sending the PERR (path error message 720) to the first mesh STA 702, the intermediate mesh STA 708 does not send the PERR to the first mesh STA 702 again until $1^{st}$-dot11MeshHWMPperrMinInterval (specified time interval for the first pair) expires. This allows PERR throttling to work and, at the same time, allows other mesh STAs to detect the link failure of link 716 without any delay. In the previous example, the intermediate mesh STA 708 sends PERR (path error message 720) to the first mesh STA 702 in response to the first mesh STA 702 sending first data 714 (destined for the destination mesh STA 710). The intermediate mesh STA 708 can send PERR in a second path error message 726 to the second mesh STA 704 in response to the second mesh STA 704 sending second data 722 (destined for the destination mesh STA 710). The intermediate mesh STA 708 can send PERR in a third path error message 728 to the third mesh STA 706 in response to the third mesh STA 706 sending third data 724 (destined for the destination mesh STA 710). Thus, upon sending the PERR (second path error message 726) to the second mesh STA 704, the intermediate mesh STA 708 does not send the PERR to the second mesh STA 704 again until $2^{nd}$-dot11MeshHWMPperrMinInterval (specified time interval for the second pair) expires. Also, upon sending the PERR (third path error message 728) to the third mesh STA 706, the intermediate mesh STA 708 does not send the PERR to the third mesh STA 706 again until $3^{rd}$-dot11MeshHWMPperrMinInterval (specified time interval for the third pair) expires. This allows PERR throttling to work and, at the same time, allows other mesh STAs to detect the link failure of link 716 without any delay. This also enables the second mesh STA 704 and third mesh STA 706 to find another path to the destination mesh STA 710.

Figure 8:
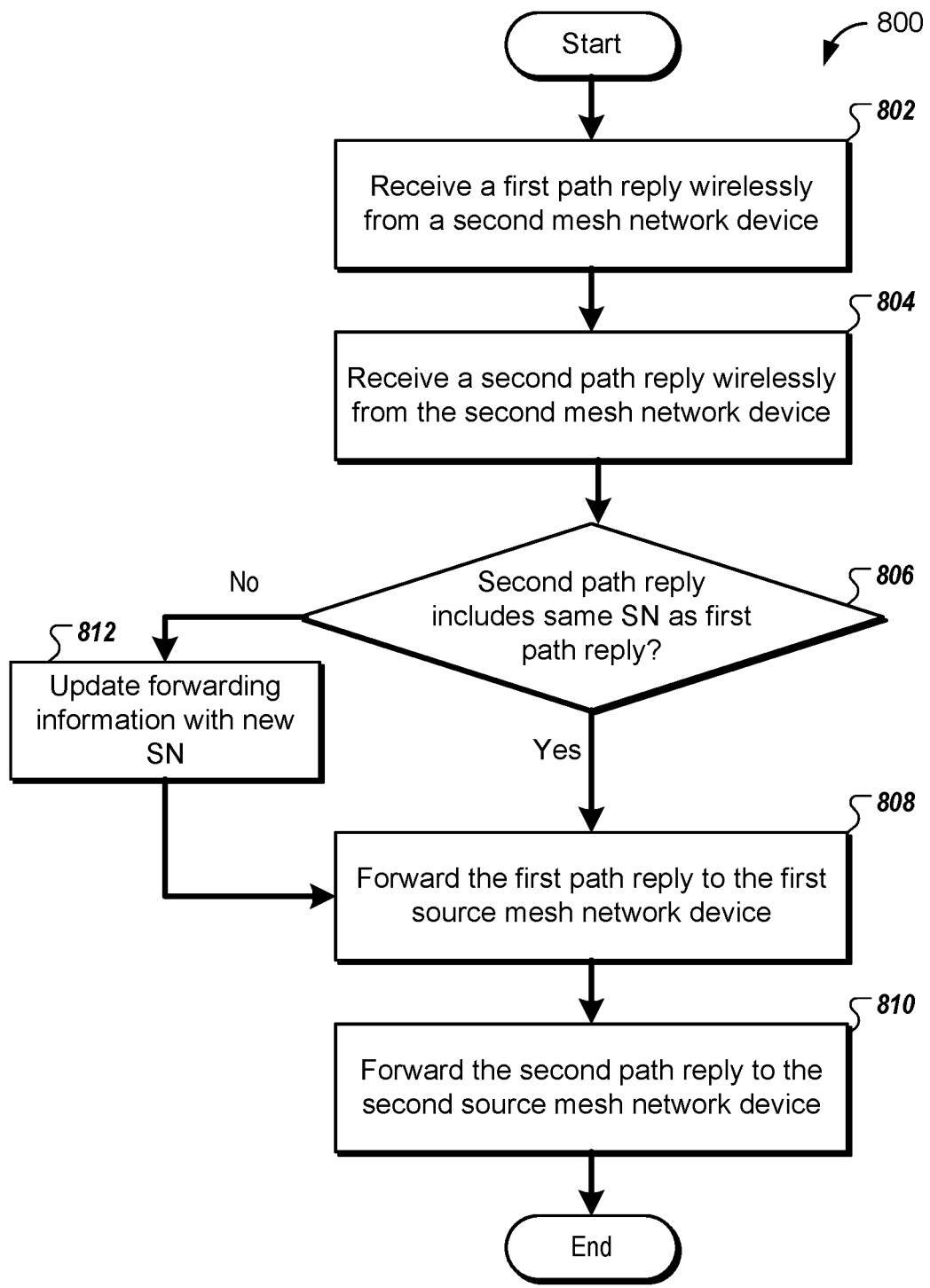
FIG. 8 is a flow diagram illustrating a method of path selection in a mesh network, according to an embodiment.

In another embodiment, when the intermediate mesh STA 708 detects that multiple originators (sources) mesh STAs are using the link 716 to the destination mesh STA 710, the intermediate mesh STA 708 can send a repeated broadcast PERR to allow other mesh STAs to discover the PERR associated with link 716 at the same time as the first mesh STA 702. Sending a repeated broadcast PERR can increase reliability FIG. 8 is a flow diagram illustrating a method 800 of path selection in a mesh network, according to an embodiment. The method 800 may be performed by processing logic that comprises hardware (e.g., circuitry, dedicated logic, programmable logic, microcode, etc.), software, firmware, or a combination thereof. In one embodiment, method 800 may be performed by any of the mesh network devices, described herein and illustrated with respect to FIGS. 1-7.

Referring to FIG. 8, the method 800 begins by the processing logic (of a first mesh network device) receives a first path reply wirelessly from a second mesh network device (block 802). The first path reply is associated with a first path request to establish a first wireless path between the second mesh network device and a third mesh network device through the first mesh network device. A path may be a number of wireless links between an originator mesh network device and a destination mesh network device with one or more intermediate mesh network devices, each wireless link being between two mesh network devices. The processing logic receives a second path reply wirelessly from the second mesh network device (block 804). The second path reply is associated with a second path request to establish a second wireless path between a fourth mesh network device and the second mesh network device through the first mesh network device. The processing logic determines that the first path reply and the second path reply include a same sequential number (SN) for the second mesh network device (block 806). It should be noted that SN is the specific mechanism that is being used in the IEEE 802.11s standard. The "SN" can be considered a temporal indicator of the second mesh network device or information that identifies temporal path information associated with the second mesh network device. So, in other embodiments, the processing logic can determine that the first path reply and the second path reply include the same temporal indicator or the same temporal path information for the second mesh network device. Also, having the same SN in the path replies indicates that the first path request and the second path request are received within a specified time interval at the second mesh network device when SN re-use is enabled in the second mesh network device. So, instead of a SN, the first path reply can include a first indicator associated with receipt of the first path request and the second path reply can include a second indicator associated with receipt of the second path request. The processing logic can determine that the first indicator and the second indicator are the same. The processing logic forwards the first path reply to the first source mesh network device (block 808) and forwards the second path reply to the second source mesh network device (block 810); and the method 800 ends. If at block 806 the second path reply has a different SN as the first path reply (i.e., a higher SN is received), the processing logic update the forwarding information with the different SN (810) and proceeds to blocks 808 and 810, and the method 800 ends.

In a further embodiment, the processing logic receives a third path reply wirelessly from the second mesh network device. The third path reply is associated with a third path request to establish a third path between a third source mesh network device and the second mesh network device. The processing logic determines that the first path reply and the third path reply each includes the same SN for the second mesh network device. The processing logic forwards the third path reply to the third source mesh network device.

In a further embodiment, the processing logic receives a third path reply wirelessly from the second mesh network device. The third path reply is associated with a third path request to establish a third path between a third source mesh network device and the second mesh network device. The processing logic determines that a third SN in the third path reply is different than a first SN in the first path reply. The processing logic updates forwarding information associated with the second mesh network device with the third SN and forwards the third path reply to the third source mesh network device.

In a further embodiment, the processing logic determines that a second path metric in the second path reply is better than a first path metric in the first path reply. The processing logic updates forwarding information associated with the second mesh network device with the second path metric. In another embodiment, the first path reply includes a first path metric and the second path reply includes a second path metric. When forwarding the first path reply at block 808, the processing logic forwards the first path reply to the first source mesh network device with the SN and the first path metric. When forwarding the second path reply at block 810, the processing logic forwards the second path reply to the second source mesh network device with the SN and whichever one of the first path metric and the second path metric is better.

In one embodiment, the first path reply and the second path reply are received within a specified time interval corresponding to a duration in which the second mesh network device is enabled to re-use the same SN. This duration can be a SN re-use duration as specified in the IEEE 802.11s standard. Also, as described herein, the path replies can be sent and received as elements of the HWMP Mesh Path Selection frames, such as PREPs. Similarly, path requests can be sent and received as elements of HWMP Mesh Path Selection frames.

Figure 9:
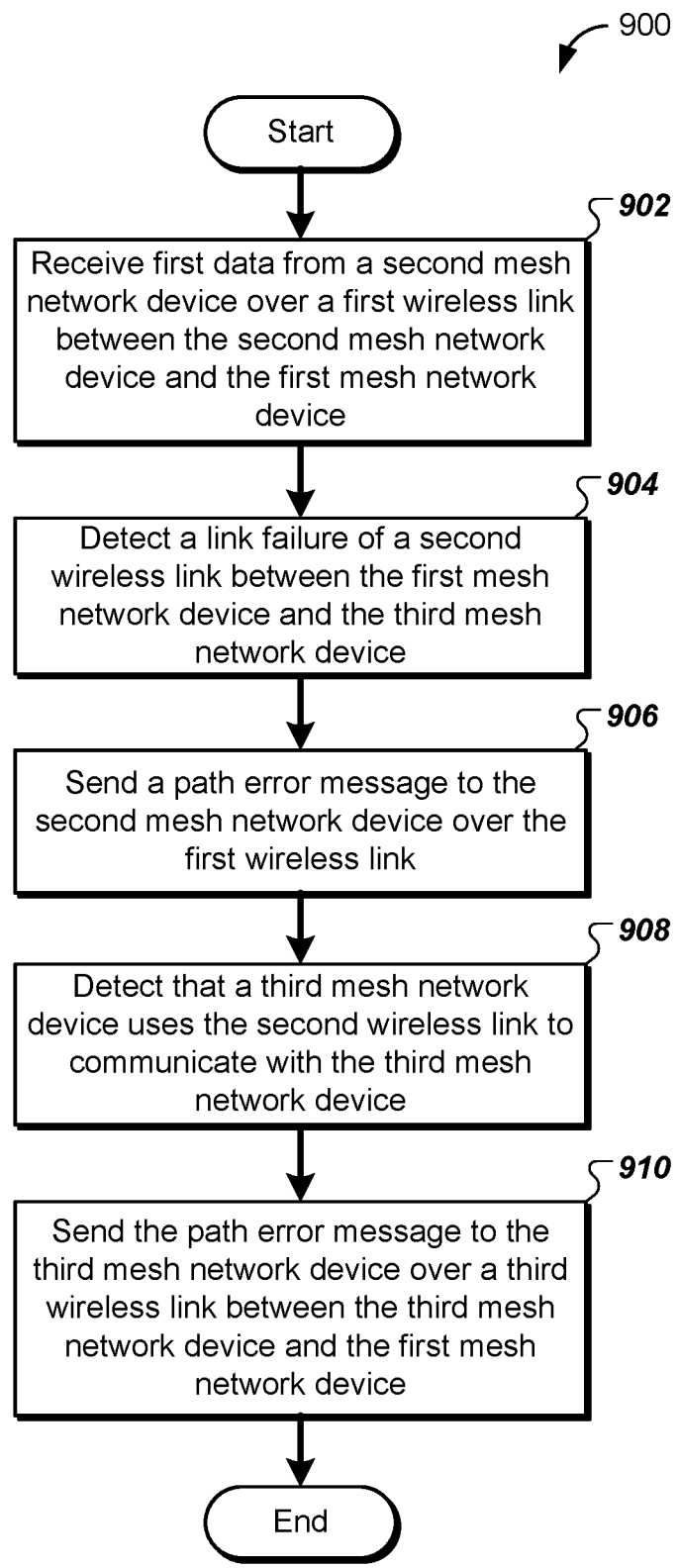
FIG. 9 is a flow diagram illustrating a method of path error detection in a mesh network, according to an embodiment.

FIG. 9 is a flow diagram illustrating a method 900 of path error detection in a mesh network, according to an embodiment. The method 900 may be performed by processing logic that comprises hardware (e.g., circuitry, dedicated logic, programmable logic, microcode, etc.), software, firmware, or a combination thereof. In one embodiment, method 900 may be performed by any of the mesh network devices, described herein and illustrated with respect to FIGS. 1-7.

Referring to FIG. 9, at block 902, the method 900 begins by the processing logic (of a first mesh network device) receiving first data from a second mesh network device over a first wireless link between the second mesh network device and the first mesh network device (block 902). The first data is destined for a third mesh network device. The processing logic detects a link failure of a second wireless link between the first mesh network device and the third mesh network device (block 904). The processing logic sends a path error message to the second mesh network device over the first wireless link (block 906). The path error message notifies the second mesh network device of the link failure of the second wireless link. The processing logic detects that a third mesh network device uses the second wireless link to communicate with the third mesh network device (block 908). The processing logic sends the path error message to the third mesh network device over a third wireless link between the third mesh network device and the first mesh network device (910); and the method 900 ends.

In a further embodiment, when sending the path error message, the processing logic sends the path error message as a PERR element in a first HWMP Mesh Path Selection frame to the first mesh network device and sends the path error message as a PERR element in a second HWMP Mesh Path Selection frame to the third mesh network device.

In another embodiment, the processing logic sets a first interval timer for a first source-destination pair comprising the first mesh network device and the second mesh network device. The first interval timer corresponds to a minimum time the first mesh network device waits to send a subsequent path error message to the first mesh network device. The processing logic sets a second interval timer for a second source-destination pair comprising the third mesh network device and the second mesh network device. The second interval timer corresponds to a minimum time the first mesh network device waits to send a subsequent path error message to the third mesh network device.

In another embodiment, the processing logic receives second data from the third mesh network device over the third wireless link. The second data is destined for the second mesh network device. The processing logic sends the sending the path error message after the receiving the second data. For example, the path error message is sent in response to second data being received from the third mesh network device. Alternatively, the processing logic can send the path error message to the third mesh network device even before receiving data form the third mesh network device.

In another embodiment, the processing logic receives first data from the third mesh network device over a first wireless link between the third mesh network device and the first mesh network device. The first data is destined for the second mesh network device. The processing logic detects a link failure of a second wireless link between the first mesh network device and the second mesh network device. The processing logic sends a path error message to the third mesh network device over the first wireless link. The path error message notifies the third mesh network device of the link failure of the second wireless link. The processing logic detects that the fourth mesh network device (and/or any additional mesh network device) uses the second wireless link to communicate with the second mesh network device. The processing logic sends the path error message to the fourth mesh network device (any/or any additional mesh network device) over a third wireless link between the fourth mesh network device and the first mesh network device.

In one embodiment, the processing logic sends the path error message to the fourth mesh network device prior to receiving second data from the fourth mesh network device over the third wireless link, the second data being destined for the second mesh network device. In another embodiment, the processing logic sends the path error message to the fourth mesh network device by sending the path error message in a PERR element in a broadcast frame (or a rebroadcast frame).

Figure 10:
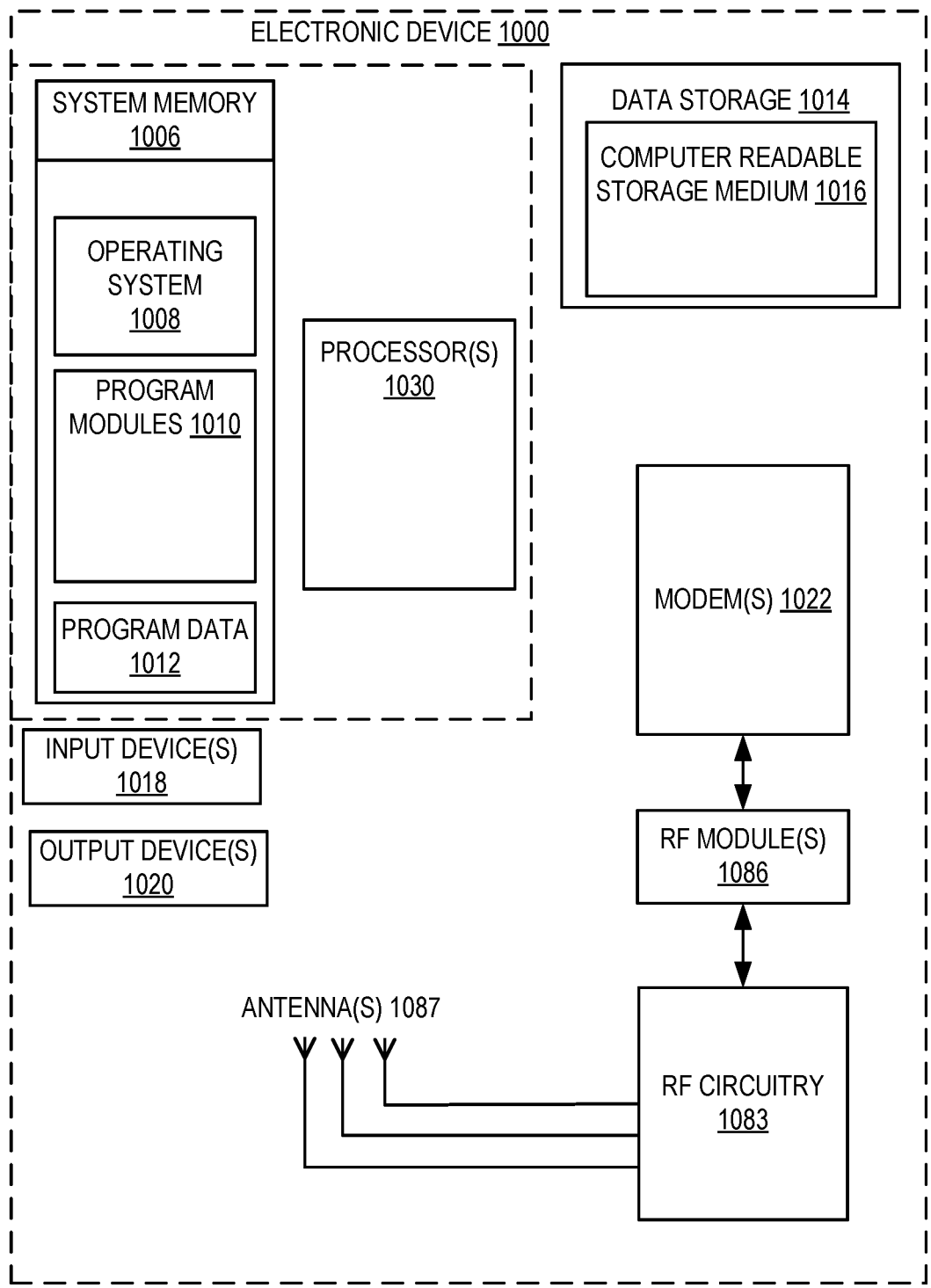
FIG. 10 is a block diagram of a wireless network device according to one embodiment.

FIG. 10 is a block diagram of a wireless network device 1000 according to one embodiment. The wireless network device 1000 may correspond to the wireless network device described above. Alternatively, the wireless network device 1000 may be other electronic devices as described herein.

The wireless network device 1000 includes one or more processor(s) 1030, such as one or more CPUs, microcontrollers, field programmable gate arrays, or other types of processors. The wireless network device 1000 also includes system memory 1006, which may correspond to any combination of volatile and/or non-volatile storage mechanisms. The system memory 1006 stores information that provides operating system component 1008, various program modules 1010, program data 1012, and/or other components. In one embodiment, the system memory 1006 stores instructions of methods to control operation of the wireless network device 1000. The wireless network device 1000 performs functions by using the processor(s) 1030 to execute instructions provided by the system memory 1006.

The wireless network device 1000 also includes a data storage device 1014 that may be composed of one or more types of removable storage and/or one or more types of non-removable storage. The data storage device 1014 includes a computer-readable storage medium 1016 on which is stored one or more sets of instructions embodying any of the methodologies or functions described herein. Instructions for the program modules 1010 may reside, completely or at least partially, within the computer-readable storage medium 1016, system memory 1006 and/or within the processor(s) 1030 during execution thereof by the wireless network device 1000, the system memory 1006 and the processor(s) 1030 also constituting computer-readable media. The wireless network device 1000 may also include one or more input devices 1018 (keyboard, mouse device, specialized selection keys, etc.) and one or more output devices 1020 (displays, printers, audio output mechanisms, etc.).

The wireless network device 1000 further includes a modem 1022 to allow the wireless network device 1000 to communicate via a wireless connections (e.g., such as provided by the wireless communication system) with other computing devices, such as remote computers, an item providing system, and so forth. The modem 1022 can be connected to one or more RF modules 1086. The RF modules 1086 may be a WLAN module, a WAN module, PAN module, GPS module, or the like. The antenna structures (antenna(s) 1087) are coupled to the RF circuitry 1083, which is coupled to the modem 1022. The RF circuitry 1083 may include radio front-end circuitry, antenna switching circuitry, impedance matching circuitry, or the like. The antennas 1084 may be WLAN antennas (such as the surface-link antennas described herein, GPS antennas, NFC antennas, other WAN antennas, WLAN or PAN antennas, or the like. The modem 1022 allows the wireless network device 1000 to handle both voice and non-voice communications (such as communications for text messages, multimedia messages, media downloads, web browsing, etc.) with a wireless communication system. The modem 1022 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1022 may generate signals and send these signals to antenna(s) 1084 of a first type (e.g., WLAN 5 GHz), antenna(s) 1085 of a second type (e.g., WLAN 2.4 GHz), and/or antenna(s) 1087 of a third type (e.g., WAN), via RF circuitry 1083, and RF module(s) 1086 as descried herein. Antennas 1087 may be configured to transmit in different frequency bands and/or using different wireless communication protocols. The antennas 1087 may be directional, omnidirectional, or non-directional antennas. In addition to sending data, antennas 1087 may also receive data, which is sent to appropriate RF modules connected to the antennas. One of the antennas 1087 may be any combination of the antenna structures described herein.

In one embodiment, the wireless network device 1000 establishes a first connection using a first wireless communication protocol, and a second connection using a different wireless communication protocol. The first wireless connection and second wireless connection may be active concurrently, for example, if a wireless network device is receiving a media item from another wireless network device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 1022 is shown to control transmission and reception via antenna (1087), the wireless network device 1000 may alternatively include multiple modems, each of which is configured to transmit/receive data via a different antenna and/or wireless transmission protocol.

In the above description, the embodiments of the surface-link antennas and antenna architectures may be used in a wireless network containing multiple network devices, organized in a network topology (e.g., AP-STA, Mesh, and Hybrid). The network devices in the wireless network cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These wireless networks can be used in the interim before broadband Internet infrastructure becomes widely available in those developing nations. The wireless network devices are also referred to herein as mesh routers, mesh network devices, mesh nodes, Meshboxes, or Meshbox nodes, even when not used in mesh configurations. Multiple wireless network devices wirelessly are connected through a network backbone formed by multiple peer-to-peer (P2P) wireless connections (i.e., wireless connections between multiple pairs of the wireless network devices). The multiple network devices are wirelessly connected to one or more client consumption devices by node-to-client (N2C) wireless connections. The multiple network devices are wirelessly connected to a mesh network control service (MNCS) device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, voice-controlled devices, and the like.

The embodiments of the wireless network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-ofpresence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. The embodiments described herein are compatible with existing content delivery technologies, and may leverage architectural solutions, such as CDN services like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless mesh station comprising:
 a first wireless local area network (WLAN) radio;
 a second WLAN radio;
 a third WLAN radio; and
 a processor operatively coupled to the first WLAN radio, the second WLAN radio, and the third WLAN radio, wherein the processor:
  receives a first path request (PREQ) from a first originator mesh station (mesh STA) via the first WLAN radio and a second PREQ from a second originator mesh STA via the third WLAN radio, the first PREQ initiates establishment of a first wireless path between the first originator mesh STA and a target mesh STA through the wireless mesh station and the second PREQ initiates establishment of a second wireless path between the second originator mesh STA and the target mesh STA through the wireless mesh station;

sends the first PREQ and the second PREQ to the target mesh STA via the second WLAN radio, wherein the first PREQ and the second PREQ are sent to the target mesh STA within a specified time interval that corresponds to a time interval in which the target mesh STA uses a sequential number;

receives a first path reply (PREP) from the target mesh STA via the second WLAN radio, the first PREP comprising a first sequential number (SN) of the target mesh STA and a first airtime link metric of the first wireless path to the target mesh STA;

stores the first SN and the first airtime link metric in forwarding information, the forwarding information identifying how data is forwarded to the target mesh STA;

sends the first PREP to the first originator mesh STA via the first WLAN radio;

receives a second PREP from the target mesh STA via the second WLAN radio, the second PREP comprising the first SN of the target mesh STA and a second airtime link metric of the second wireless path to the target mesh STA;

determines that the second PREP comprises the same first SN as the first PREP; and sends the second PREP to the second originator mesh STA via the third WLAN radio responsive to the second PREP comprising the same first SN as the first PREP, the second PREP comprising the first SN and a last updated one of the first airtime link metric and the second airtime link metric.

2. The wireless mesh station of claim 1, further comprising a fourth WLAN radio, wherein the processor further operates according to the Hybrid Wireless Mesh Path (HWMP) selection protocol to communicate with other mesh STAs, wherein the processor is further:

receives a third PREQ from a third originator mesh STA, via the fourth WLAN radio, within the specified time interval of receiving the first PREQ;

sends the third PREQ to the target mesh STA via the second WLAN radio;

receives a third PREP from the target mesh STA via the second WLAN radio, the third PREP comprising a second SN of the target mesh STA that is higher than the first SN and a third airtime link metric that is higher than the first airtime link metric;

updating the forwarding information with the second SN and the third airtime link metric; and sends the third PREP to the third originator mesh STA via the fourth WLAN radio.

3. The wireless mesh station of claim 1, further comprising a fourth WLAN radio, wherein the processor further operates according to the Hybrid Wireless Mesh Path (HWMP) selection protocol to communicate with other mesh STAs, wherein the processor is further:

receives a third PREQ from a third originator mesh STA, via the fourth WLAN radio, within the specified time interval of receiving the first PREQ;

propagates the third PREQ to the target mesh STA via the second WLAN radio;

receives a third PREP from the target mesh STA via the second WLAN radio, the third PREP comprising the same first SN and a third airtime link metric that is the same or lower than the first airtime link metric; and propagates the third PREP including the first SN and a last updated one of the first airtime link metric or the third airtime link metric to the third originator mesh STA via the fourth WLAN radio.

4. A method comprising:

receiving, at a first mesh network device, a first response from a second mesh network device, the first response being associated with a first request sent by a third mesh network device to establish a first wireless path between the third mesh network device and the second mesh network device through the first mesh network device;

receiving, at the first mesh network device, a second response from the second mesh network device, the second response being associated with a second request sent by a fourth mesh network device to establish a second wireless path between the fourth mesh network device and the second mesh network device through the first mesh network device;

determining that the first response and the second response comprise a same first sequential number (SN) associated with the second mesh network device;

forwarding, by the first mesh network device, the first response to the third mesh network device; and forwarding, by the first mesh network device, the second response to the fourth mesh network device responsive to determining that the first response and the second response comprises the same first SN.

5. The method of claim 4, further comprising:

receiving, at the first mesh network device, a third response from the second mesh network device, the third response associated with a third request sent by a fifth mesh network device to establish a third wireless path between the fifth mesh network device and the second mesh network device;

determining that the first response and the third response each comprises the first SN; and forwarding, by the first mesh network device, the third response to the third mesh network device.

6. The method of claim 4, further comprising:

receiving, at the first mesh network device, a third response from the second mesh network device, the third response associated with a third request to establish a third path between a third mesh network device and the second mesh network device;

determining that a third SN in the third response is different than a first SN in the first response;

updating forwarding information associated with the second mesh network device with the third SN; and forwarding, by the first mesh network device, the third response to the third mesh network device.

7. The method of claim 4, further comprising:

determining that a second path metric in the second response is higher than a first path metric in the first response; and updating forwarding information with the second path metric, the forwarding information identifying how data is forwarded to the second mesh network device.

8. The method of claim 7, wherein the first response comprises a first path metric and the second response comprises a second path metric, wherein the forwarding the first response comprises forwarding the first response to the third mesh network device with the SN and the first path metric, and wherein the forwarding the second response comprises forwarding the second response to the second mesh network device, the second response forwarded comprising the SN and whichever one of the first path metric and the second path metric is last updated.

9. The method of claim 4, wherein the first response and the second response are received within a specified time interval corresponding to a duration in which the second mesh network device re-uses the same SN.

10. The method of claim 4, wherein the receiving the first response comprises receiving a path reply (PREP) element of a first Hybrid Wireless Mesh Path (HWMP) Mesh Path Selection frame, and wherein the first request is a path request (PREM) element of a second HWMP Mesh Path Selection frame.

11. The method of claim 4, further comprising:
  receiving, by the first mesh network device, first data from the third mesh network device over a first wireless link between the third mesh network device and the first mesh network device, the first data being destined for the second mesh network device;
  detecting, by the first mesh network device, failure of a second wireless link between the first mesh network device and the second mesh network device;
  sending, by the first mesh network device, an error message to the third mesh network device over the first wireless link, the error message notifying the third mesh network device of the failure of the second wireless link;
  detecting, by the first mesh network device, that the second wireless path comprises the second wireless link to communicate with the second mesh network device; and
  sending, by the first mesh network device, the error message to the fourth mesh network device over a third wireless link between the fourth mesh network device and the first mesh network device.

12. The method of claim 11, wherein the sending the error message to the third mesh network device comprises sending the error message as a path error (PERR) element in a first Hybrid Wireless Mesh Path (HWMP) Mesh Path Selection frame to the first mesh network device, and wherein the sending the error message to the fourth mesh network device comprises sending the error message as a PERR element in a second HWMP Mesh Path Selection frame to the fourth mesh network device.

13. The method of claim 11, further comprising:
  setting a first timer associated with a first source-destination pair comprising the third mesh network device and the second mesh network device, wherein the first timer corresponds to a minimum time the first mesh network device waits to send a subsequent error message to the third mesh network device; and
  setting a second timer associated with a second source-destination pair comprising the fourth mesh network device and the second mesh network device, wherein the second timer corresponds to a minimum time the first mesh network device waits to send a subsequent error message to the fourth mesh network device.

14. The method of claim 11, further comprising:
  receiving, by the first mesh network device, second data from the fourth mesh network device over the third wireless link, the second data being destined for the second mesh network device, and wherein the sending the error message to the fourth mesh network device comprises sending the error message after the second data is received.

15. The method of claim 11, wherein the sending the error message to the fourth mesh network device comprises sending the error message prior to receiving second data from the fourth mesh network device over the third wireless link, the second data being destined for the second mesh network device.

16. The method of claim 11, wherein the sending the error message to the fourth mesh network device comprises sending the error message in a PERR element in a broadcast frame.

17. A first mesh network device comprising:
  a first radio;
  a second radio;
  a third radio; and
  a processor operatively coupled to the first radio, the second radio, and the third radio, wherein the processor is configured to:
    receive a first response from a second mesh network device, the first response being associated with a first request sent by a third mesh network device to establish a first wireless path between the third mesh network device and the second mesh network device through the first mesh network device;
    receive a second response from the second mesh network device, the second response being associated with a second request sent by a fourth mesh network device to establish a second wireless path between the fourth mesh network device and the second mesh network device through the first mesh network device;
    determine that the first response and the second response comprise a same first sequential number (SN) associated with the second mesh network device;
    forward the first response to the third mesh network device; and
    forward the second response to the fourth mesh network device responsive to the first response and the second response comprising the same first SN.

18. The first mesh network device of claim 17, wherein the processor is further configured to:
  receive a third response from the second mesh network device, the third response associated with a third request sent by a fifth mesh network device to establish a third wireless path between the fifth mesh network device and the second mesh network device;
  determine that the first response and the third response each comprises the first SN; and
  forward the third response to the third mesh network device.

19. The first mesh network device of claim 17, wherein the processor is further configured to:
  receive a third response from the second mesh network device, the third response associated with a third request to establish a third path between a third mesh network device and the second mesh network device;
  determine that a third SN in the third response is different than a first SN in the first response;
  update forwarding information associated with the second mesh network device with the third SN; and
  forward the third response to the third mesh network device.

20. The first mesh network device of claim 17, wherein the processor is further configured to:
  determine that a second path metric in the second response is higher than a first path metric in the first response; and update forwarding information with the second path metric, the forwarding information identifying how data is forwarded to the second mesh network device.

\* \* \* \* \*